United States Patent
Roosli et al.

(10) Patent No.: US 10,348,773 B2
(45) Date of Patent: *Jul. 9, 2019

(54) SECURITY SETTINGS AND INDICATIONS OF CONTROLLERS

(71) Applicant: Honeywell International Inc., Morris Plains, NJ (US)

(72) Inventors: Philipp A. Roosli, Niantic, CT (US); Daniel Heine, Kenmore, WA (US)

(73) Assignee: Honeywell International Inc., Morris Plains, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/973,162

(22) Filed: May 7, 2018

(65) Prior Publication Data

US 2018/0255105 A1 Sep. 6, 2018

Related U.S. Application Data

(63) Continuation of application No. 14/328,370, filed on Jul. 10, 2014, now Pat. No. 9,967,281.

(51) Int. Cl.
*H04L 29/00* (2006.01)
*H04L 29/06* (2006.01)

(52) U.S. Cl.
CPC .......... *H04L 63/20* (2013.01); *H04L 63/0209* (2013.01); *H04L 63/1441* (2013.01)

(58) Field of Classification Search
CPC .. H04L 63/20; H04L 63/0209; H04L 63/1441
USPC .......................................................... 726/1
See application file for complete search history.

(56) References Cited

U.S. PATENT DOCUMENTS

| 7,518,506 B2* | 4/2009 | Lee ..................... G08B 25/08 340/531 |
| 7,741,969 B2 | 6/2010 | Linford |
| 8,087,593 B2* | 1/2012 | Leen ...................... G05B 13/02 236/91 D |
| 9,967,281 B2 | 5/2018 | Roosli et al. |
| 2006/0080464 A1 | 4/2006 | Kozuki |

(Continued)

OTHER PUBLICATIONS

ODVA, Inc., "Securing EtherNet/IP Networks," 22 pages, 2011.

*Primary Examiner* — Brandon S Hoffman
*Assistant Examiner* — Michael D Anderson
(74) *Attorney, Agent, or Firm* — Seager, Tufte & Wickhem LLP

(57) ABSTRACT

A system and approach having security assurance for a controller relative to outside connections such as internet. The controller may have locked and exposed modes. A locked mode may mean that the system is correctly configured in that security related settings meet minimum standards. For example, the controller is protected through sufficiently strong user accounts and passwords whether entered or by default. Also, there may be an entity, such as person or organization that has responsibility for securing the controller against undesired intrusions. In the exposed mode, where the system may be incorrectly configured, the controller may shut down some or all of the functionality that has relevance to remote access. In the exposed mode, a built-in web server may show one or more screens that allow one to access the controller. There may be security indicators, such as lights that indicate whether the controller is exposed or locked.

17 Claims, 7 Drawing Sheets

(56) References Cited

U.S. PATENT DOCUMENTS

| | | | |
|---|---|---|---|
| 2006/0271695 A1* | 11/2006 | Lavian | G06F 21/552 |
| | | | 709/229 |
| 2007/0130294 A1 | 6/2007 | Nishio | |
| 2012/0239221 A1 | 9/2012 | Mighdoll et al. | |
| 2015/0161621 A1 | 6/2015 | Becker | |

* cited by examiner

SECURITY SETTINGS AND INDICATIONS OF CONTROLLERS

This patent application is a continuation of U.S. patent application Ser. No. 14/328,370, filed Jul. 10, 2014, and entitled "Security Settings and Indications of Controllers". U.S. patent application Ser. No. 14/328,370, filed Jul. 10, 2014, is hereby incorporated by reference.

BACKGROUND

The present disclosure pertains to controllers and particularly controllers having security features.

SUMMARY

The disclosure reveals a system and approach having security assurance for a controller relative to outside connections such as internet. The controller may have locked and exposed modes. A locked mode may mean that the system is correctly configured in that virtually all security related settings meet minimum standards. For example, the controller is protected through sufficiently strong user accounts and passwords whether entered or by default. Also, there may be an entity, such as person or organization that has responsibility for securing the controller against undesired intrusions. In the exposed mode, where the system may be incorrectly configured, the controller may shut down some or all of the functionality that has relevance to remote access. In the exposed mode, a built-in web server may show one or more screens that allow one to take over the controller. Access may be had with an address or a serial number, and then a random code may be emailed to an entered email address of an authorized delegate or user that can unlock the system and set or adjust defined security related settings that meet the desired configured strength. The settings may be saved and the controller can be locked from a security viewpoint. There may be security indicators, such as one or more lights or labels that indicate whether the controller is exposed or locked.

DESCRIPTION

The present system and approach may incorporate one or more processors, computers, controllers, user interfaces, wireless and/or wire connections, and/or the like, in an implementation described and/or shown herein.

This description may provide one or more illustrative and specific examples or ways of implementing the present system and approach. There may be numerous other examples or ways of implementing the system and approach.

Figure 1:
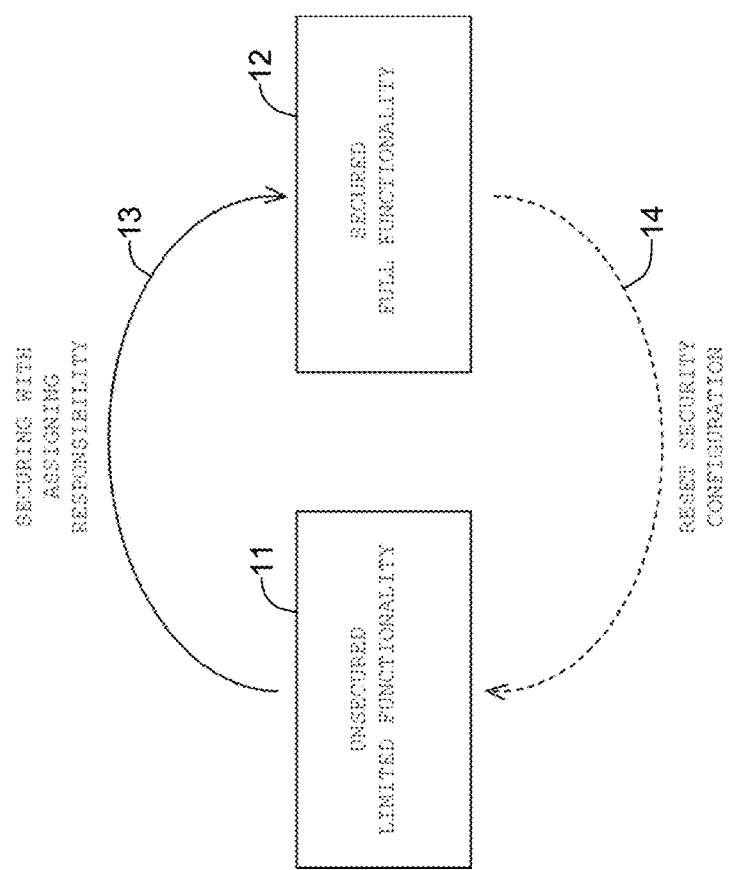
FIG. 1 is a diagram indicating enforced security settings relating to controllers.

Enforced security settings and indications of controllers may be noted. FIG. 1 is a diagram indicating enforced security settings relating to controllers. There may be a controller that is unsecured with limited functionality as shown by symbol 11. There may be a securing with an assignment of responsibility as shown with an arrow 13 from symbol 11 to a symbol 12 representing a secured controller with full functionality. As a controller may become unsecured with limited functionality at symbol 11, a security configuration may be reset as indicated by arrow 14.

Figures 2A, 2B:
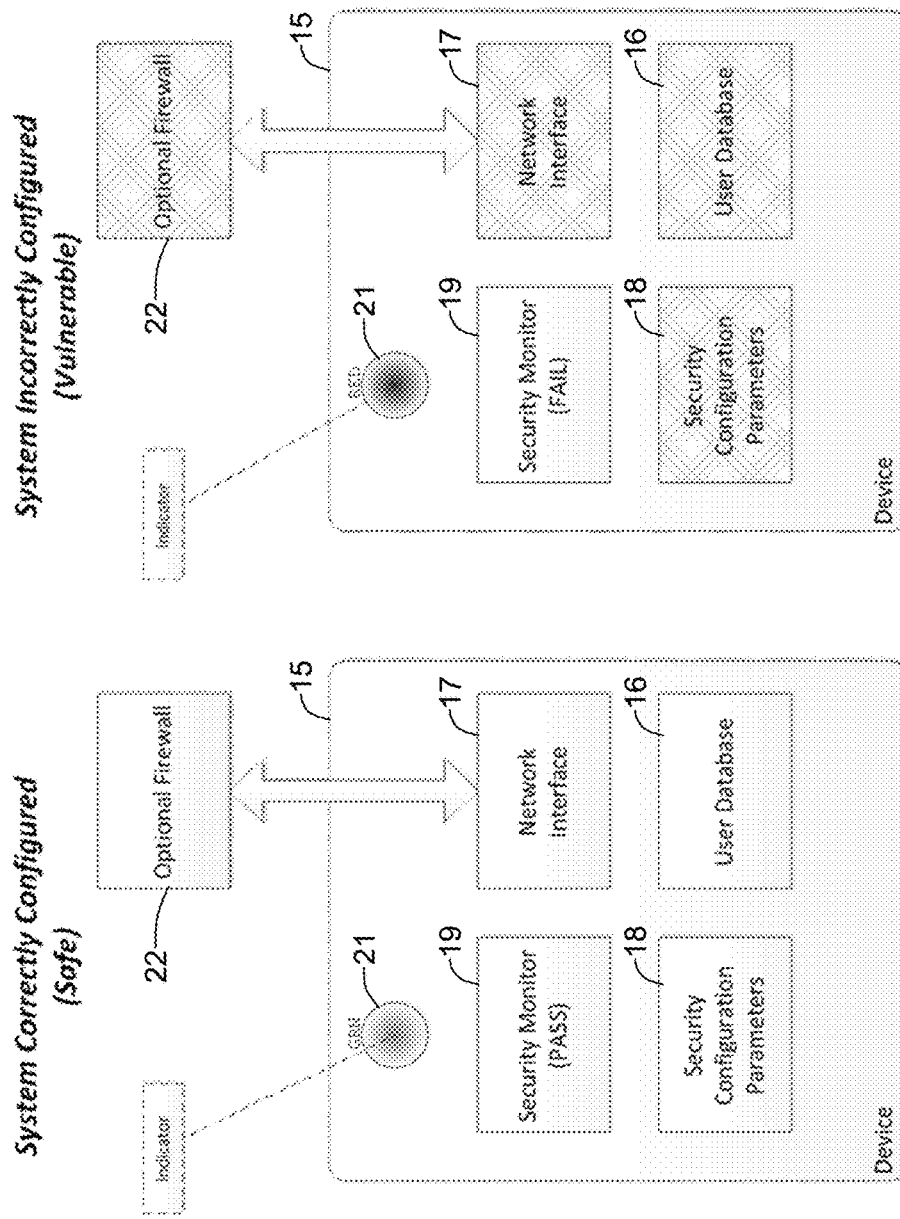
FIG. 2a is a diagram indicating a system correctly configured and regarded as safe relative to a device.
FIG. 2b is a diagram indicating a system incorrectly configured and regarded as vulnerable relative to a device.

FIG. 2a is a diagram indicating a system correctly configured and regarded as safe relative to a device 15. FIG. 2b is a diagram indicating a system incorrectly configured and regarded as vulnerable relative to device 15. Device 15 may have a user database 16, a network interface 17, security configuration parameters 18, a security monitor 19 and an indicator 21. Network interface 17 may be connected to a firewall 22 external to device 15. Security monitor 19 may indicate a "pass" and indicator 21 may be a light such as a green one or be no light.

Device 15 in the diagram of FIG. 2b may have the same components as device 15 in the diagram of FIG. 2a. The system of device 15 in the diagram may be regarded as incorrectly configured relative to user database 16 or network interface 17 as indicated by shading in the symbols representing user database 16 or network interface 17, respectively, or as indicated by the fill in the symbols. Optional firewall 22 having a fill or shading in its symbol may imply the system of device 15 to be considered incorrectly configured and thus vulnerable. Security monitor 19 may indicate a "fail" and the indicator may be a light such as a red one or a flashing one with a color such as red or some other color.

Other terms may be used to describe the configuration condition of device 15 in FIG. 2a and FIG. 2b. The system for device 15 in FIG. 2a may be considered as having a locked operating mode. The system for device 15 in FIG. 2b may be considered as having an exposed operating mode.

Increasingly, modern building control systems and components may be connected to the public internet. The reason may be that users desire to monitor and control such systems from anywhere at any time. This may be achieved typically by integrating a web server into the controller where the user can use a browser to access the controller or a larger system hosted by the controller. Next to a man-machine-interface, internet connected controllers may also use the machine-to-machine functionality to augment control strategies with information obtained through the internet from other controllers and software services. This situation may bring an onslaught of security challenges. Controllers connected to the internet may become targets for cyber-attacks. Some attacks may attack low level aspects, as detection of file transfer protocol (FTP) services that allow stealing data files or storing unauthorized content on the device. However, a very common mistake in such systems may be that the user accounts and selected passwords are too trivial, unchanged from the default values or not setup at all. Often the user responsible for this shortcoming is not necessarily sufficiently aware that the controller may appear on the public internet such as during the system planning, before the requirement was even formulated yet. Another reason may be that the firewall, that protects a setup and may be meant to keep a system private, might be mis-configured and a once segregated network becomes visible on the public internet. This, for example, might happen if a selected appliance on the private network needs to be reachable from the internet and due to a too simple or untested firewall configuration, additional controllers inadvertently become visible.

Exposed controllers may be increasingly becoming hacking targets and successful break-ins are unwelcome events. Controllers may typically manage an expensive infrastructure, keep processes going, supporting people in their daily activities and manage data that has strategic value that is intended to be kept private. Further, a security breach also may make for bad press as the manufacturer of the controller, the integrator of the system and the end-user can be faulted for risking valuable operating assets to cyber attackers. The present approach may improve this situation by enforcing better equipment protection.

The controller may feature several distinct operating modes. They may be exposed and locked. The locked mode may state that all security related settings meet a minimal standard, that an identified person or organization has taken the responsibility, and that all security policies have been set to these standards. On the other hand, if the device is not protected through user accounts and passwords, or by default accounts and passwords, or if the passwords are considered to be weak, or if no person or organization has taken over the responsibility to secure the controller, the controller may be considered exposed.

Figure 3:
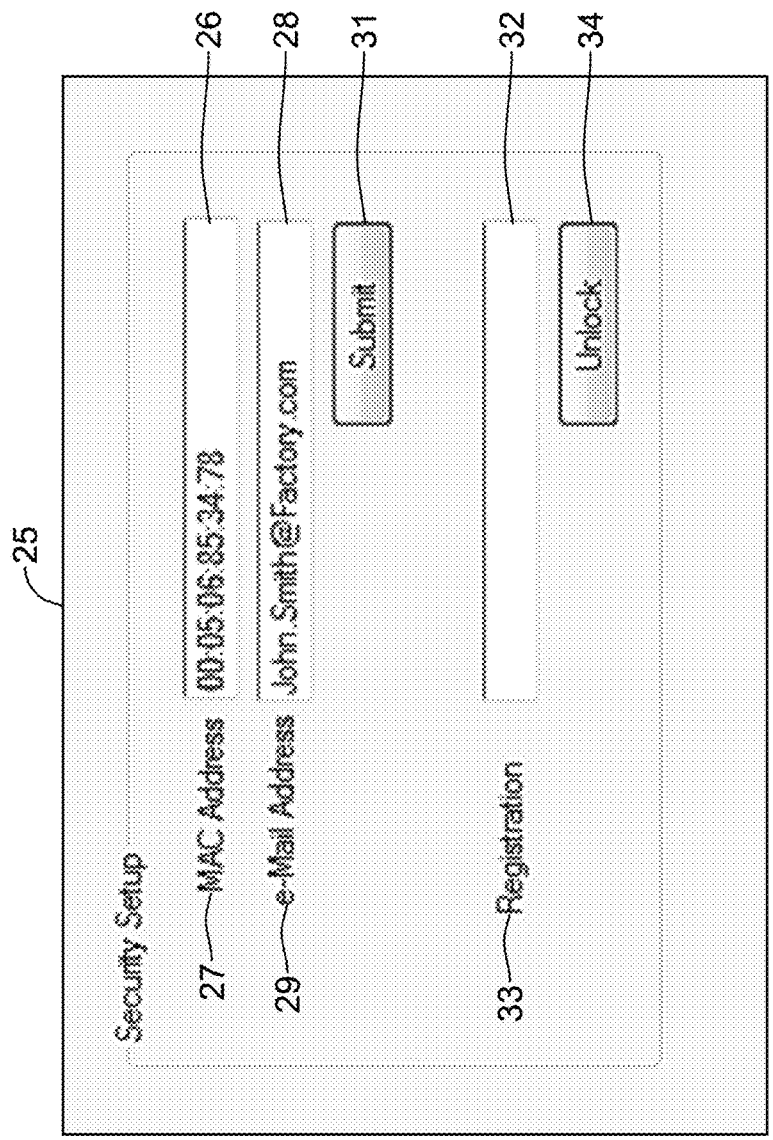
FIG. 3 is a diagram of an example screen for a security setup.

In an exposed mode, the controller may shut-down some or all functionality that has relevance for remote access. No process data is necessarily made visible and no incoming control information necessarily propagated to the process (no read/write of data points). In the exposed mode, the built-in web server may show a simple screen that allows taking over the security of the device. An example screen 25 may for a security setup be given in FIG. 3. In screen 25, the user may enter a MAC (media access control) address of the controller in space 26. The MAC address may be only available to a user that has physical access to the controller as the device itself has a label 27 that states "MAC Address". Guessing a MAC address, even if the first three manufacturer bytes may be subtracted, may still leave a very large number of possible MAC addresses open to guess. If the MAC address is deemed not secure enough, an alternative long random serial number may be substituted. Further, the email address of the person who will take over the responsibility for the security settings may be entered in space 28 labeled "e-Mail Address". When the user presses a submit button 29, the controller may verify that the MAC address or serial number is the valid one and then send an email with random code to the stated email address. To assure that this screen withstands a brute force attack, the form can only be filled out a few times at full native speed. After a few incorrect entries, the form may add exponentially longer timeouts. To avoid a high-jacking of the information of this web page, the web server may have to be tested against cross-site hacking vulnerabilities.

Figure 4:
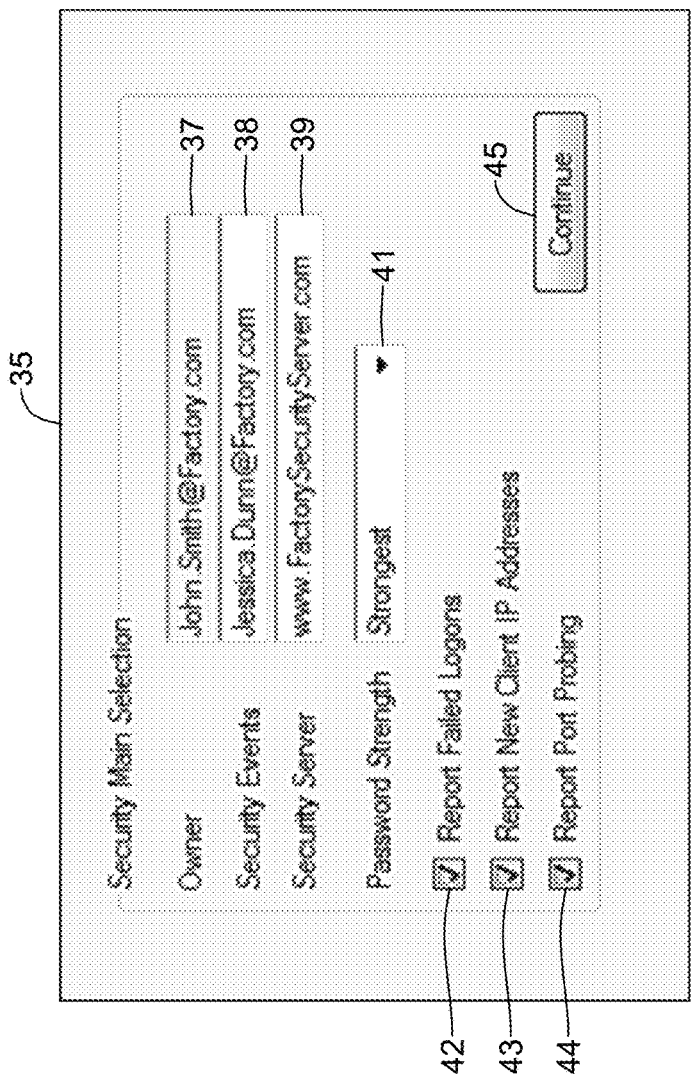
FIG. 4 is a diagram of a screen for security main selection.

The user may receive the email with the random code and paste the code into a field 32 with a label 33 stating "Registration", and press the unlock button 34. If the correct registration code is entered, the user can successfully unlock the device and the next screen 35 in a diagram of FIG. 4 may appear. In this screen, labeled "Security Main Selection", there may be a space 37 for entry of an email address of the owner. An email address of a person responsible for security events may be entered in space 38. A web site for a security server may be entered in a space 39. Password strength, such as strongest, strong, medium, weak or weakest, may be selected at space 41. Items that may be selected or checked related to security may incorporate report failed logons at box 42, report a new client IP address at box 43, and report port probing at box 44.

The configuration may be further enhanced by defining a number of security related settings, such as who will get email notifications in case of the detection of cyber-attacks, and a server that receives periodic cyber health status from the controller. Settings such as if failed logons should be reported, a new client IP address or if an auxiliary port is being probed by a remote host can be selected to activate the monitoring of suspect activities. For failed logins, it may be important that the failed user account and password is not transmitted in the clear as a failed logon is normally a normal user who made a typing mistake and one does not want that the controller to send fragments of nearly correct account and password over the internet as part of a warning. The presented security settings may be merely of an exemplary nature and additional attributes can easily be envisioned.

Figure 5:
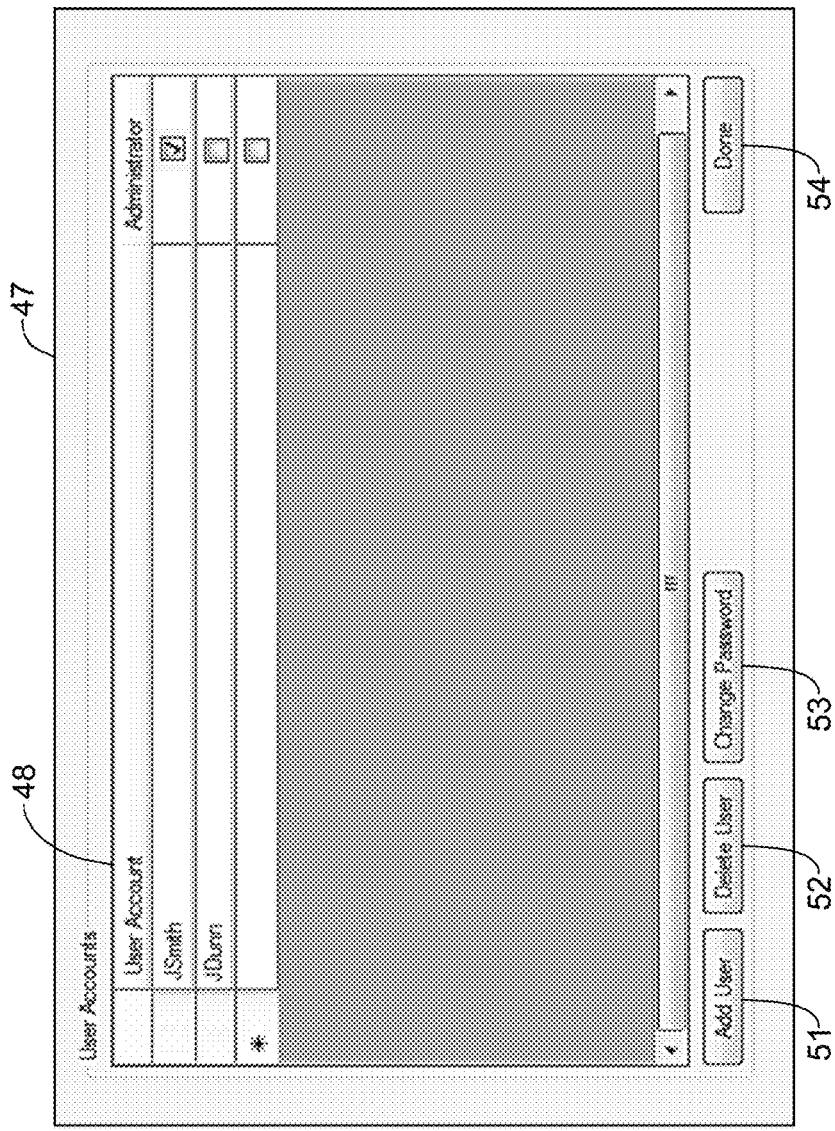
FIG. 5 a diagram of a screen for adding user accounts.

One may press a continue button 45 to go to a subsequent screen 47 shown by a diagram of FIG. 5. The setup may be complemented in screen 47 by adding user accounts 48 along with an indication, whether a listed user account of a user indicated by a name, is an administrator. Once all information has been entered and the passwords of the user accounts meet the configured strength, all settings may be saved and the controller may be now locked from a security setting view point. Button 51, 52, 53 and 54 may be pressed to add a user, to delete a user, to change a password, and to be done, respectively.

Figure 6:
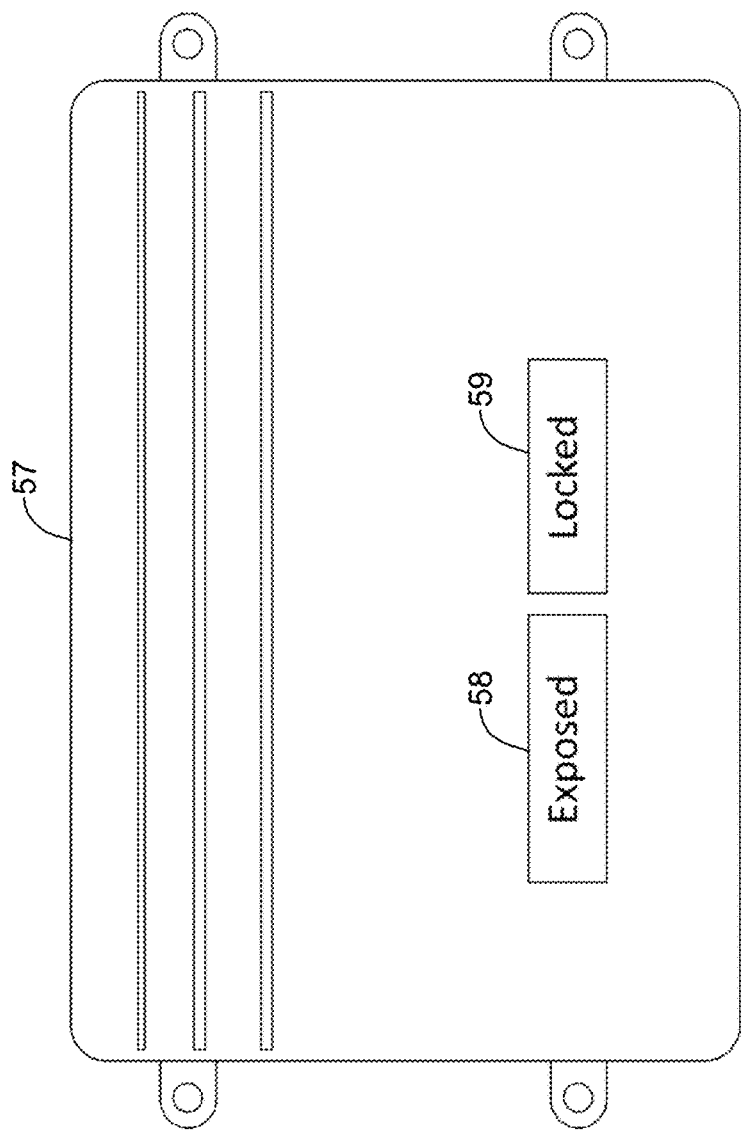
FIG. 6 is a diagram of two indicators for noting whether a controller is exposed or locked.

To enhance the cyber security awareness, the controller hardware 57 may feature two visible indicators 58 and 59 as outlined in a diagram of FIG. 6. When the controller is exposed, the corresponding indicator 58 may flash with a red indicator or one of another color. If the controller is secured and locked, the corresponding indicator 59 may be turned on solid, associated with a green or other color, or may use a "dark-cockpit" or "dark-is-normal" concept and remain unlit when all is secure.

Movement toward security may be achieved with one or more of the following steps: 1) Build the web server pages and the modes into the controller software; 2) Store security settings, in particular, the person who is taking over the responsibility to setup and maintain the security settings and all user accounts into a secure memory area of the controller; 3) Set the controller to monitor potential attack vector surfaces, such as failed logons, probing of TCP/IP and UDP ports, new IP addresses of clients and denial-of-service attacks; 4) Set the controller to timestamp and report these events to a security server that is hosted by the end-customer, the integrator and/or the controller manufacturer; 5) Send suspected break-in events in the form of emails to a person who will be delegated to monitor the equipment; and 6) If a high rate of such events would be created, consolidate these events and report that a consolidation takes place in an email to the security delegate. The latter step may avoid that the email inbox will be swamped with countless messages during a heavy attack.

Figure 7:
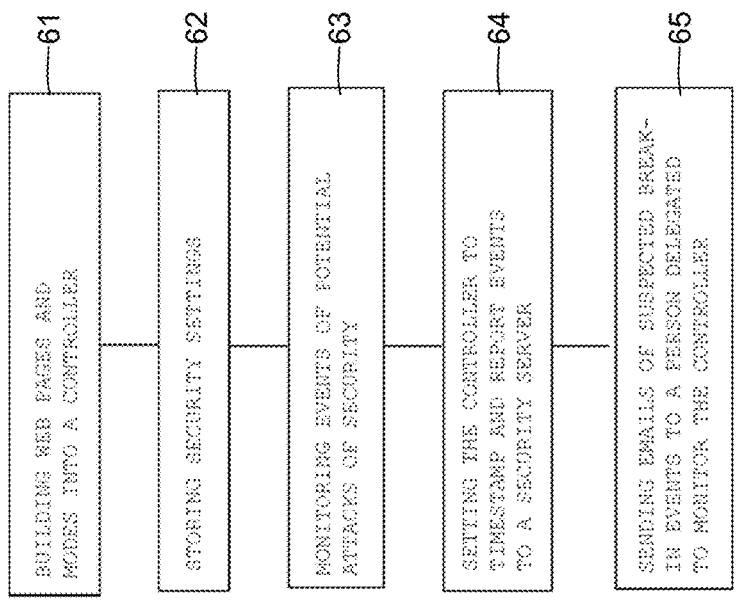
FIG. 7 is a diagram of steps that may be taken to increase security of a controller.

FIG. 7 is a diagram of steps that may be taken to increase security of a controller. Symbol 61 may indicate building web server pages and modes into the controller. Symbol 62 may indicate storing security settings. Symbol 63 may indicate monitoring events of potential attacks of security. Symbol 64 may indicate setting the controller to timestamp and report events to a security server. Symbol 65 may indicate sending emails of suspected break-in events to a person delegated to monitor the controller.

In case all user accounts and passwords are lost, one may allow a recovery of the device only if the user can provide the MAC address (or serial number) of the device, and press a button on the device that states that he/she had access into the perimeter where the device is located. In such a case, wipe the entire existing security settings and setup all settings anew from scratch.

A visible indication of internet connectivity and cybersecurity configuration threats for a building controller or display may be noted. When control equipment is installed in a building that has the potential to connect to the Internet, it may be easy to misconfigure the equipment or external security measures such as firewalls, virtual private networks (VPNs), and so forth, such that the building equipment is left exposed to security threats. There may be currently no easy way to look at a piece of equipment without special equipment or penetration test apparatus and determine whether or not it is correctly configured for the desired level of security.

A unique indication may be provided (e.g., a green LED or optional "dark is Ok"—i.e., no LED) if the system is correctly configured. A different indication (e.g., a red LED) may be provided if the system is misconfigured.

When installing a thermostat that has Internet connectivity, for example, a red LED may be lit if the ports, external firewall, security credentials, and so on, are misconfigured such that normal operation is not possible or if there is a security threat detected such as open ports that should have been locked down.

If the proper connectivity is detected, the certificates may be valid, and the user database may be configured correctly, the green LED would be lit or, if the "dark OK" option is selected, there would be an absence of light.

In addition, a network-visible indication of this status may also be available for consolidation in a security dashboard so that the health and configuration status of all devices in a site or building could be displayed to the maintenance technician or operator.

The security configuration for each device would be monitored either internally using built-in, standalone algorithms or externally with cooperation of an external client or server using built-in cooperative algorithms in order to determine the correct operation.

A key may be to display the correct configuration and/or threat status using a single or a limited number of indicators that make it easy and obvious to the installer, building operator, or other responsible parties that the device is secure and operating correctly. This may reduce the incidence of unintended configuration failures, increase the cybersecurity of a building, and increase the value of a company's equipment by providing a solution to this issue.

To recap, a security assurance system for a building controller may incorporate a controller having a locked mode and an exposed mode. The locked mode may incorporate at least one item of a group consisting of one or more security settings and policies that meet predetermined standards, and an entity designated to assume the responsibility to assure that the security settings and policies meet the predetermined standards. The exposed mode may incorporate at least one item of a group consisting of an absence of security settings and policies that meet the predetermined standards, and an absence of an entity designated to assure that the security settings and policies meet the predetermined standards.

The controller may incorporate a security monitor having an automatic remote notification mechanism (e.g., messaging, emails, or calling a web service in the cloud) that notifies an entity designated to assume responsibility for security of the controller, upon detection of a security threat or misconfiguration of the controller. The security monitor may have a manual selector (e.g., pushing on a lighted or selected button, or clicking on a button on a web page) to initiate the automatic remote notification mechanism.

A security policy that meets the predetermined standards may incorporate an entity designated to assume a responsibility to assure that the security settings and policies meet the predetermined standards.

A responsibility of a security configuration may be cleanly delegated to a system integrator and away from a vendor (e.g., a company) of the controller or equipment. Features may be in support of the system integrator to understand whether the integrator has properly secured the controller. The present approach may further an accountability transfer from the vendor to the integrator.

In the exposed mode, the controller may shut down a functionality having relevance for remote access.

The controller may incorporate a web-server that provides a screen for display and entities. The web-server may permit a user to enter a media access control (MAC) address or a serial number of the controller so that the user can access and adjust the security settings to meet the predetermined standards.

The controller may incorporate a web-server that provides a screen for display and entities. The web-server may permit a user to enter a MAC address of the controller or a serial number. An email address may be entered on the screen of the entity designated to assure that the security settings and policies meet the predetermined standards. The controller may verify that the MAC or serial number is valid or it may do a timeout if the MAC or serial number is invalid. If the MAC or serial number is valid, then the controller may send an email with a random code to the email address entered on the screen. The entity may enter the code on the screen to result in an unlocking of the controller and another screen that reveals access to the security settings which can be adjusted to meet the predetermined standards.

The security settings may incorporate what entity is to receive notifications of a group consisting of detected cyber-attacks and cyber health status of the controller, a number of failed logons, a new client internet protocol (IP) address, and a port probe by a remote host to be selected to activate monitoring of suspect activities. A failed MAC address, serial number, random code, user account or password may be prevented from being sent out by the controller over the internet.

The security settings may be saved and the controller may be locked relative to the security settings.

The controller may incorporate an indicator that reveals whether the controller is in the locked mode or the exposed mode.

A security structure of the controller may incorporate one or more web pages, the locked mode and the exposed mode, a storage of security settings, a monitoring of potential attack vector surface events, a timestamp of the events, or a transmission of the events to the entity designated to monitor the controller.

A case in which an account, a password, or a code is lost, the MAC address or serial number of the controller may be entered in a screen of the display to gain access to the security settings. The security settings may be eliminated and security settings may be setup again anew.

An approach, for monitoring security fitness of a building controller, may incorporate providing a building controller connectable to an external communication system, providing one or more visual indicators of status of a configuration from a security perspective of the building controller, checking a configuration of one or more items from a group consisting of a firewall, a network interface, virtual private networks, security credentials, communication ports, a user database, and a connectivity status to the external communication system. A configuration that is acceptable from the security perspective may meet predetermined security criteria.

If a configuration of an item fails to meet the predetermined security criteria, then the item of the configuration may be regarded as misconfigured.

A configuration from the security perspective may be monitored internally with one or more built-in, standalone algorithms, or monitored externally of one or more build-in cooperative algorithms in cooperation with of an external client or server.

The approach may further incorporate providing a dashboard that incorporates the one or more visual indicators of the status of the configuration from a security perspective of the building controller.

A security indicator mechanism may incorporate a device. The device may incorporate a processor, a network interface connected to the processor, a user database memory connected to the processor and connectable to a web, and a security monitor connected to the network interface, the user database memory, and the processor.

The mechanism may further incorporate a security indicator connected to the security monitor. The security indicator may exhibit a first light if there is a security issue detected. The security indicator may exhibit a second light or no light if there is an absence of a security issue detected.

If the device is incorrectly configured, the device may be vulnerable to a security breach. If the device is correctly configured, then the device may be safe from a security breach. The device may be correctly configured if appropriate security configuration parameters are setup in the device.

In the present specification, some of the matter may be of a hypothetical or prophetic nature although stated in another manner or tense.

Although the present system and/or approach has been described with respect to at least one illustrative example, many variations and modifications will become apparent to those skilled in the art upon reading the specification. It is therefore the intention that the appended claims be interpreted as broadly as possible in view of the related art to include all such variations and modifications.

What is claimed is:

1. A security assurance system for a building controller comprising:
   a controller having a locked mode and an exposed mode relative to outside connections such as internet, the controller including a security monitor configured to determine whether the controller is in the locked mode or the exposed mode; and
   wherein:
   the locked mode comprises at least one item of a group consisting of one or more security settings and policies that meet predetermined standards, and an entity designated to assume responsibility to assure that security settings and policies meet the predetermined standards;
   the exposed mode comprises at least one item of a group consisting of an absence of security settings and policies that meet the predetermined standards, and an absence of an entity designated to assure that the security settings and policies meet the predetermined standards;
   the security monitor determines whether the controller is in the locked mode or the exposed mode based on the items related to security settings and policies and a presence or the absence of the entity designated to assure the security settings and policies meet the predetermined standards; and
   the controller comprises an indicator that reveals whether the controller is in the locked mode or the exposed mode.

2. The security assurance system of claim 1, wherein the security monitor has an automatic remote notification mechanism that notifies an entity designated to assume responsibility for security of the controller, upon detection of a security threat or misconfiguration of the controller.

3. The security assurance system of claim 2, wherein the security monitor has a manual selector to initiate the automatic remote notification mechanism.

4. The security assurance system of claim 1, wherein a security policy that meets the predetermined standards incorporates an entity designated to assume a responsibility to assure that the security settings and policies meet the predetermined standards.

5. The security assurance system of claim 4, wherein in the exposed mode, the controller automatically shuts down a functionality having relevance for remote access.

6. The security assurance system of claim 4, wherein:
   the controller comprises a web-server that provides a screen for display and entities; and
   the web-server permits a user to enter a media access control (MAC) address or a serial number of the controller so that the user can access and adjust the security settings to meet the predetermined standards.

7. The security assurance system of claim 4, wherein:
   the controller comprises a web-server that provides a screen for display and entities; and
   wherein:
   the web-server permits a user to enter a MAC address of the controller or a serial number;
   an email address is entered on the screen of the entity designated to assure that the security settings and policies meet the predetermined standards;
   the controller verifies that the MAC address or serial number is valid or does a timeout if the MAC address or serial number is invalid;
   if the MAC address or serial number is valid, then the controller sends an email with a random code to the email address entered on the screen; and
   the entity enters the random code on the screen to result in an unlocking of the controller and another screen that reveals access to the security settings which can be adjusted to meet the predetermined standards.

8. The security assurance system of claim 7, wherein the security settings comprise what entity is to receive notifications of one or more items from a group consisting of detected cyber-attacks, cyber health status of the controller, a number of failed logons, a new client internet protocol (IP) address, and a port probe by a remote host to be selected to activate monitoring of suspect activities.

9. The security assurance system of claim 8, wherein a failed MAC address, serial number, random code, user account or password are prevented from being sent out by the controller over the internet.

10. The security assurance system of claim 1, wherein the security settings are saved and the controller is locked relative to the security settings.

11. The security assurance system of claim 1, wherein the indicator that reveals whether the controller is in the locked mode or the exposed mode is selected from the group consisting of one or more indicator lights and a dashboard.

12. The security assurance system of claim 1, wherein a security structure of the controller comprises:
   one or more web pages;
   the locked mode and the exposed mode;
   a storage of security settings;
   a monitoring of potential attack vector surface events;
   a timestamp of the events; or
   a transmission of the events to the entity designated to monitor the controller.

13. The security assurance system of claim 6, wherein:
   when an account, a password, or a code is lost, the MAC address or serial number of the controller is entered in a screen of the display to gain access to the security settings; and
   the security settings are eliminated and security settings are setup again anew.

14. A method, for monitoring security fitness of a building controller, comprising:
   providing a building controller connectable to an external communication system;
   providing one or more visual indicators of status of a configuration from a security perspective of the building controller, the one or more visual indicators of status selected from the group consisting of one or more indicator lights and a dashboard;
   checking a configuration of one or more items from a group consisting of a firewall, a network interface, virtual private networks, security credentials, communication ports, a user database, and a connectivity status to the external communication system; and
   determining whether the building controller is in a locked mode or an exposed mode based on whether or not the configuration of one or more items meets security criteria; and
   wherein:
   the building controller is in the exposed mode when a configuration of one or more items does not meet the security criteria; and
   wherein the building controller is in the locked mode when the configuration of one or more items meets the security criteria.

15. The method of claim 14, wherein if a configuration of an item fails to meet the security criteria, then the item of the configuration is regarded as misconfigured.

16. The method of claim 14, wherein the configuration of one or more items is monitored internally with one or more built-in, standalone algorithms, or monitored externally of one or more build-in cooperative algorithms in cooperation with of an external client or server.

17. The method of claim 14, further comprising notifying an entity designated to assume responsibility to assure that the security criteria and policies are met when suspected break-in events are detected.

\* \* \* \* \*